United States Patent [19]
Kice

[11] Patent Number: 4,607,987
[45] Date of Patent: Aug. 26, 1986

[54] MULTIPLE LIFT PNEUMATIC CONVEYING AIR VELOCITY CONTROL APPARATUS AND METHOD FOR CONTROLLING THE PNEUMATIC VELOCITY IN A MULTIPLE LIFT PNEUMATIC CONVEYING AIR VELOCITY CONTROL APPARATUS

[75] Inventor: John E. Kice, Wichita, Kans.

[73] Assignee: Kice Metal Products Co., Inc., Wichita, Kans.

[21] Appl. No.: 675,017

[22] Filed: Nov. 26, 1984

[51] Int. Cl.$^4$ ............................................. B65G 53/66
[52] U.S. Cl. ...................................... 406/14; 73/195; 73/756; 239/76; 406/173
[58] Field of Search ............... 406/14, 173; 73/861.63, 73/195, 756; 239/76

[56] References Cited

U.S. PATENT DOCUMENTS

| | | | |
|---|---|---|---|
| 2,390,301 | 12/1945 | Hart | 73/756 X |
| 3,144,046 | 8/1964 | Seesselberg | 73/195 X |
| 3,739,159 | 6/1973 | Nalley | 73/195 X |
| 4,262,287 | 4/1981 | McLoughlin et al. | 73/195 X |
| 4,402,635 | 9/1983 | Maruo | 406/14 |

FOREIGN PATENT DOCUMENTS

| | | | |
|---|---|---|---|
| 811578 | 8/1951 | Fed. Rep. of Germany | 406/14 |
| 698872 | 11/1979 | U.S.S.R. | 406/14 |

Primary Examiner—Jeffrey V. Nase
Attorney, Agent, or Firm—John H. Widdowson; John W. Carpenter

[57] ABSTRACT

A pneumatic conveying air velocity control apparatus comprising multiple pneumatic lifts including multiple cyclones, at least one manifold, and multiple pneumatic conduits intercommunicating the cyclones with the manifold and having a structure defining a venturi with a venturi inlet side and a venturi throat. Multiple sets of a first, second, and a third 2-way valve for each of the pneumatic lift are provided. The first 2-way valve pneumatically communicates with a pneumatic actuator and with a controller, and the second 2-way valve pneumatically communicates with the venturi inlet side and the controller; and the third 2-way valve pneumatically communicates with the venturi throat and the controller for detecting the pneumatic flow rate through the pneumatic conduit. A sequencer is provided for mechanically engaging at least one set of 2-way valve at any given time. A method for controlling the pneumatic velocity in a multiple lift pneumatic conveying air velocity control apparatus.

10 Claims, 9 Drawing Figures

MULTIPLE LIFT PNEUMATIC CONVEYING AIR VELOCITY CONTROL APPARATUS AND METHOD FOR CONTROLLING THE PNEUMATIC VELOCITY IN A MULTIPLE LIFT PNEUMATIC CONVEYING AIR VELOCITY CONTROL APPARATUS

BACKGROUND OF THE INVENTION

1. Field of the Invention

This invention provides a pneumatic conveying air velocity control apparatus and method for controlling with a controller means the pneumatic velocity in a pneumatic conveying air velocity control apparatus. More specifically, this invention contemplates a novel method for controlling with a controller the pneumatic velocity in a pneumatic conveying air velocity control apparatus which includes a sequencer.

2. Description of the Prior Art

U.S. Pat. No. 4,014,577 by Clancy, et al discloses a pneumatic conveying system for conveying through a plurality of lines wherein only sufficient air volume is required to move the material and each of the lines contain a restriction to maintain a substantially constant mass flow rate of air in the line. U.S. Pat. No. 4,402,635 by Maruo teaches a pneumatic conveyor system which provides for a flow through a plurality of pipes in a blower which is operated in response to a flow regulator so as to maintain a sufficient rate of flow to transport the particulate solids. U.S. Pat. No. 3,393,016 by Van Doorn, et al illustrates a pneumatic conveyance system wherein the control automatically decreases or shuts off the volume of air passing through the fan or blower when a reduced amount or no material is being moved through the system. None of the foregoing prior art teach or suggest the improved method for controlling with a controller the pneumatic velocity in an improved pneumatic conveying air velocity control apparatus of this invention.

SUMMARY OF THE INVENTION

This invention accomplishes its desired objects by providing a pneumatic conveying air velocity control apparatus comprising at least one pneumatic lift including at least one cyclone means, at least one manifold means, and at least one pneumatic conduit intercommunicating the cyclone means with the manifold means and having a structure defining a venturi with a venturi inlet side in a venturi throat. The apparatus additionally includes at least one damper means pivotally connected within the at least one pneumatic conduit on the venturi inlet side, and at least one pneumatic actuator means is engaged to the damper means for opening and closing the same. A controller means is provided; and at least one set of a first, a second and a third 2-way valve means for each of the pneumatic lifts is also provided. The first 2-way valve pneumatically communicates with the pneumatic actuator, and with the controller means. The second 2-way valve pneumatically communicates with the venturi inlet side and the controller means, and the third 2-way valve pneumatically communicates with the venturi throat and the controller means, for detecting the pneumatic flow rate through the pneumatic conduit. A sequencer means is provided for mechanically engaging all of the sets of 2-way valve means, but only one set at any given time.

This invention also accomplishes its desired objects by providing a novel method for controlling with a controller means the pneumatic velocity in a pneumatic conveying air velocity control apparatus having at least one pneumatic lift including one cyclone means, at least one manifold means, at least one pneumatic conduit intercommunicating each of the cyclone means with each of the manifold means and having a structure defining a venturi with a venturi inlet side and a venturi throat. The pneumatic conveying air velocity control apparatus additionally includes at least one damper means pivotally connected within each of the pneumatic conduits on each of the venturi inlet sides, and at least one pneumatic actuator means engaged to each damper means for opening and closing the same. The method comprises the steps of: engaging pneumatically at least one set of a first, a second and a third 2-way valve means to each of the pneumatic lift such that each of the first 2-way valve means is respectively pneumatically engaged to the controller means and each of the pneumatic actuator means, and each of the second 2-way valve means is respectively pneumatically engaged to the controller means and to each of the venturi inlet sides and each of the third 2-way valve means is respectively electrically engaged to the controller means and to each of the venturi throats; and setting in the controller means the desired pneumatic flow velocity for each of the pneumatic conduits. The method additionally comprises engaging at any given time one set of said first, said second and said third 2-way valve means such that the controller means through the engaged said second and the engaged said third 2-way valve means can detect and read the pressure signals in the pneumatic conduit emanating from the venturi inlet side and the venturi throat pneumatically connected to the engaged second and the engaged said third 2-way valve means such that when the actual pneumatic flow velocity is different than the set desired pneumatic flow velocity the controller means sends an output signal to the pneumatic actuator means through the engaged said first 2-way valve means in order to readjust the output pressure of the pneumatic actuator means which in turn resets the damper means in the pneumatic conduit.

It is an object of the invention to provide a novel pneumatic conveying air velocity control apparatus.

Still further objects of the invention reside in the provision of a novel method for controlling with a controller means the pneumatic velocity in a pneumatic conveying air velocity control apparatus.

These together with the various ancillary objects and features will become apparent as the following description proceeds, are attained by this invention, preferred embodiments being shown in the accompanying drawings by way of example only, wherein:

DETAILED DESCRIPTION OF THE INVENTION

Figure 1:
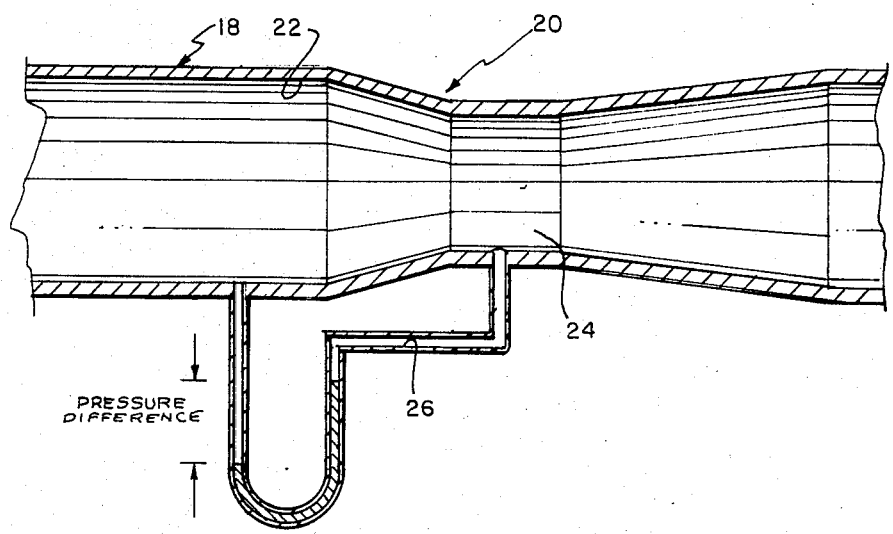
FIG. 1 is a partial elevational view disclosing a venturi with a pressure differential between the venturi throat and the inlet venturi side.
Figure 2:
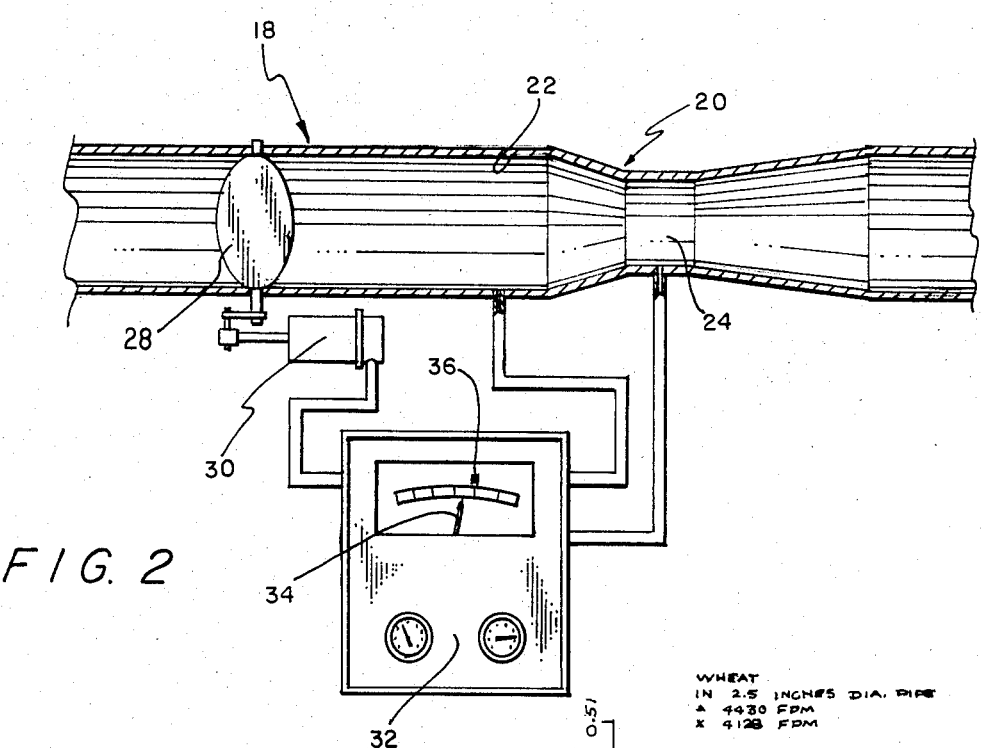
FIG. 2 is a partial front elevational view of a pneumatic conduit having a venturi with the venturi throat and venturi inlet side in electrical communication with a controller and a damper pivotally connected within the pneumatic conduit and mechanically engaged by an activator which is pneumatically in communication with the controller.

Referring in detail now to the drawings, wherein similar parts of the invention are identified by like reference numerals, there is seen a pneumatic conveying air velocity control apparatus, generally illustrated as 10, having multiple pneumatic lifts generally illustrated as 12 (three shown). Each pneumatic lift 12 includes a cyclone 14, a manifold 16, and pneumatic conduits, generally illustrated as 18, each of which interconnect each cyclone 14 to the manifold 16 (see FIG. 5). Each pneumatic conduit 18 (see FIGS. 1 and 2) includes a venturi, generally illustrated as 20, which has an inlet side 22 and a throat 24. By the nature of the venturi 20, the inlet side 22 and the throat 24 of the venturi 20 has a difference in pressure or a differential pressure when flow exist which can be detected by guage 26 which interconnects (for intercommunicating) the inlet side 22 and the throat 24. Each of the pneumatic conduits 18 also includes a damper 28 pivotally connected therein. A pneumatic actuator 30 is engaged to each damper 28 for opening and closing the same.

The control apparatus 10 additionally includes a controller 32 (see FIGS. 2 and 5) having a velocity indicator 34 and a movably, adjustably set point 36; and at least one set of a first, a second and a third 2-way valve means, each set of which will be generally illustrated as 38. In a preferred embodiment of the invention there is one set of a first, a second and a third 2-way valve means 38 for each pneumatic lift 12 which, preferably as previously mentioned, is three. The first 2-way valve of each set 38 will be designated 40, the second 2-way valve 42, and the third 44. The first 2-way valve 40 of each set 38 is capable of pneumatically communicating to one of the actuators 30 and to the controller 32. The second 2-way valve 42 is also capable of pneumatically communicating with one of the venturi inlet sides 22 and the controller 32, and the third 2-way valve 44 of each set 38 is capable of pneumatically communicating with one of the venturi throats 24 and the controller 32. The second 2-way valve 42 in combination with the third 2-way valve 44 of any given set 38 acts to connect one of several venturi flow meter's signals to the controller 32. Output signals are transmitted by the controller 32 to any given predetermined first 2-way valve 40 which passes the output signal on to the respective actuator 30 that it is pneumatically engaged to.

Figure 5:
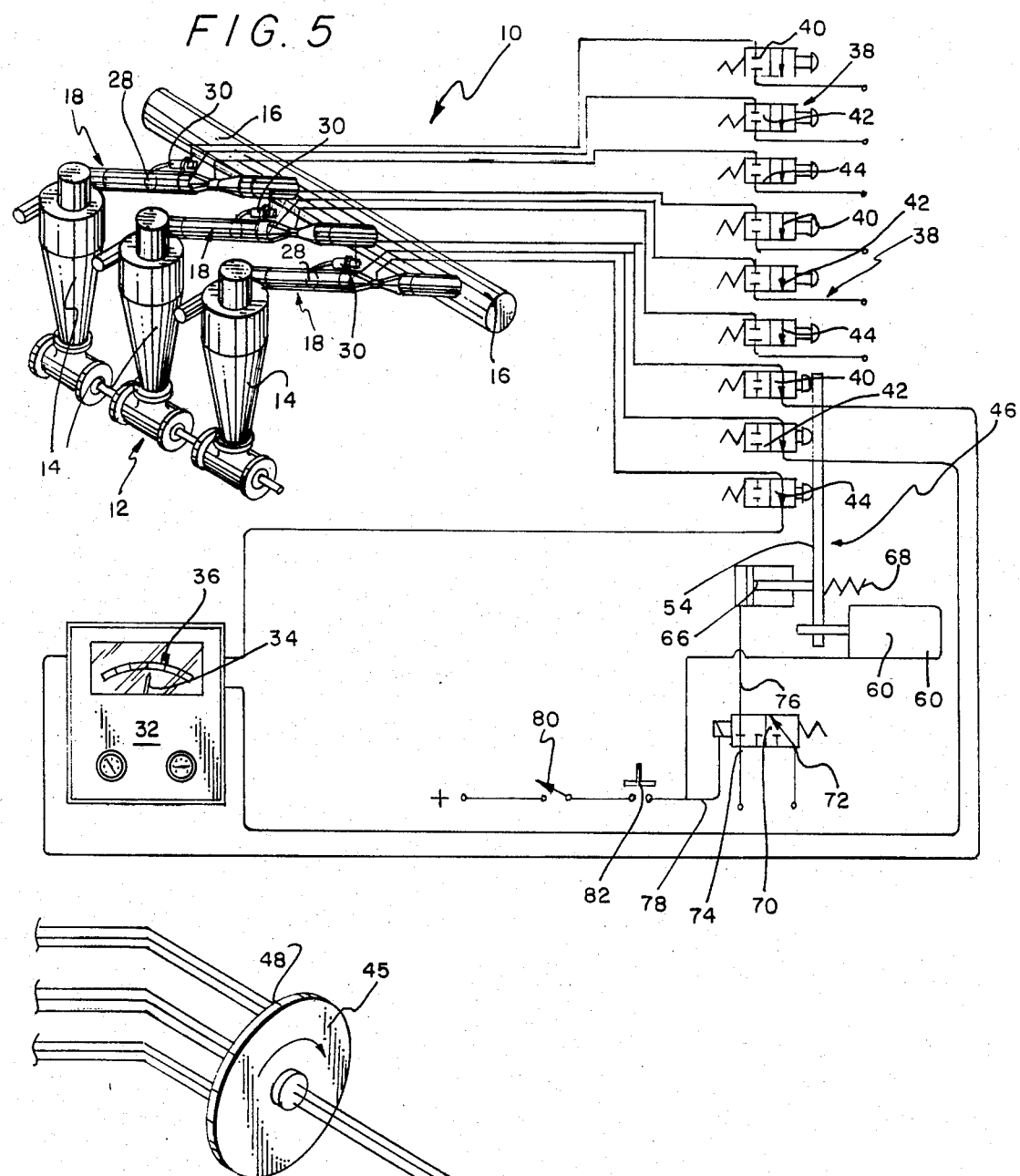
FIG. 5 is a perspective view of a plurality of pneumatic lifts pneumatically connected through a plurality of 2-way valves and a controller means and further illustrating a sequencer engaging three of the plurality of 2-way valves.
Figure 4:
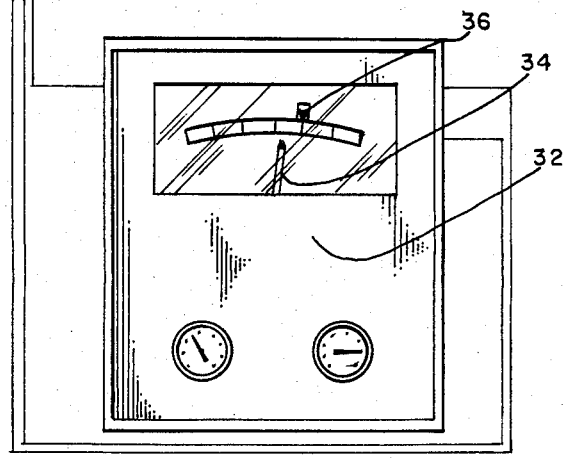
FIG. 4 is an enlarged partial perspective view of the sequencer partially defined by a cam engaging three of the plurality of 2-way valves and in pneumatic communication with the controller means.
Figure 6:
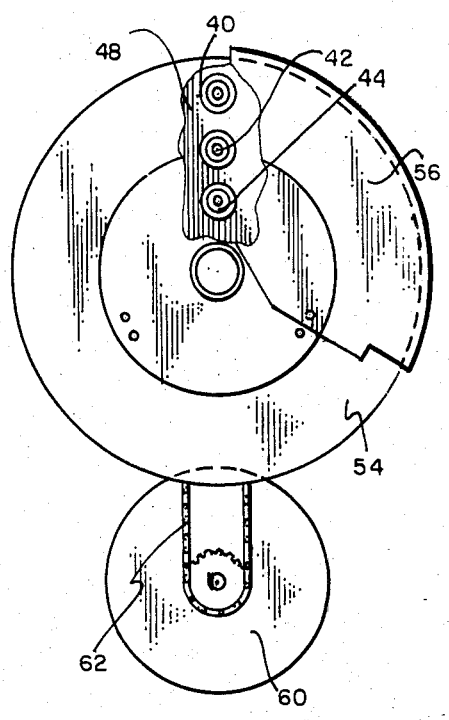
FIG. 6 is a partial front elevational view of the cam depicting the generally 90° arcuate segment attached on the face thereof.
Figure 7:
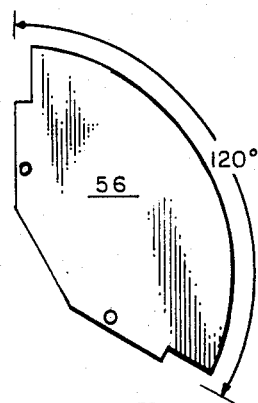
FIG. 7 is a front elevational view of the generally 90° arcuate segment which attaches to the face of the cam.
Figure 9:
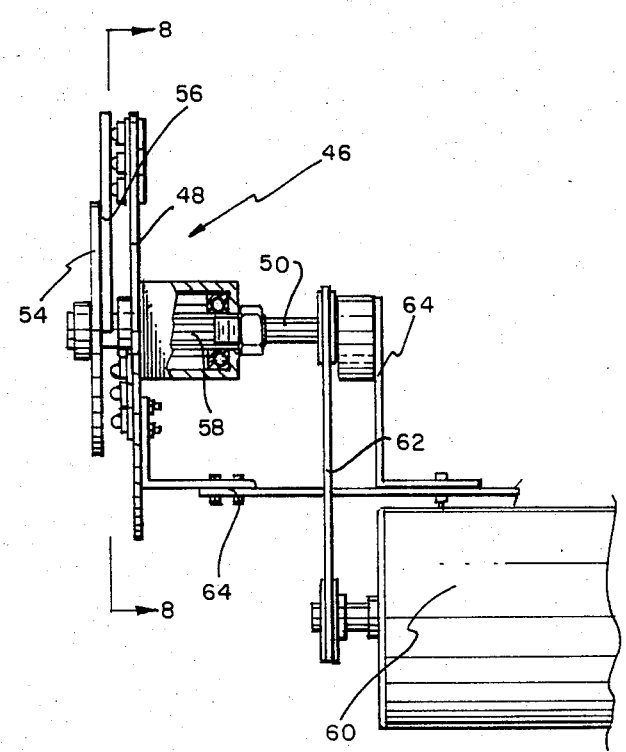
FIG. 9 is a partial sectional view of the cam of the sequencer being engaged with motor which drives the cam.
Figure 8:
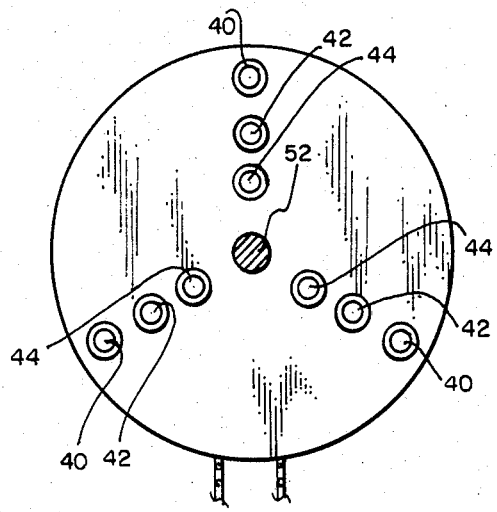
FIG. 8 is a vertical view taken in direction of the arrows and along the plane of line 8—8 in FIG. 9.

Only one set of a first 40, a second 42 and a third 44 valve of any given sets of 2-way valve means 38 are mechanically engaged at any given time and this is accomplished by a sequencer means, generally illustrated as 46 (see FIG. 5). Sequencer 46 comprises a valve plate 48 (see FIG. 8) mounted on a common shaft 50 such that the common shaft 50 rotates through an aperture 52 of the valve plate 48 without disturbing the position of the valve plate 48. The preferred three sets of the first valve 40, the second valve 42, and the third valve 44 are radially disposed on the valve plate 48 from its aperture 52 (as illustrated in FIG. 8) such as to be about 120° apart. Sequencer 46 also includes a cam plate 54 stationarily affixed to the end of common shaft 50 to rotate therewith, and a cam segment 56 bound superimposedly to the cam plate 54 in order to engage at any given time only one set 38 of any of the three sets 38 of the first valve 40, the second valve 42 and the third valve 44. In a preferred embodiment of the invention, the cam segment 56 defines an arc of about 120° (see FIG. 7) because with three sets of 2-way valve means 38 radially disposed at a preferred 120° apart as illustrated in FIG. 8, arc of cam segment 56 needs to be approximately 120° in order for one row or set of 2-way valve means 38 to be activated as the previous row or set of 2-way valve means 38 is released, which is a preferred mode of operation of the three sets of 2-way valve means 38.

Sequencer 46 additionally includes a bearing means 58 generally flushed against the valve plate 48 and rotatably receives therethrough the common shaft 50. Common shaft 50 receives rotational power from a gear motor means 60 via belt means 62 (or chain means). A bracket means 64 mounts the common shaft 50 on the motor means 60 while simultaneously retaining the valve plate 48 stationary in order to keep the same from rotating. In a preferred embodiment of the sequencer 46, cylinder means 66 (see FIG. 5) spring biasedly controls via spring 68 cam plate 54 and cam segment 56 against any given or predetermined set of the 2-way valve means 38. 3-way air valve means 70 receiving 100 psig of air at 72 and having a vent at 74 communicating with cylinder means 66 through line 76. A 120 volt AC line 78 supplies power (from a power source) to both the motor means 60 and the 3-way air valve means 70. A manual switch 80 and a differential pressure switch 82 are placed in line 78 (see FIG. 5). Sequencer 46 allows pneumatic velocity to be measured and controlled individually in each of the many lines, one at a time, using one controller 32. This makes automatic velocity control economically feasible for mills and processing plants using many pneumatic conveying lines. In existing conventional conveying systems, when line velocity is too low, the product stops flowing and the process is shut down; and when velocities are too high, horsepower requirements are higher than necessary.

Figure 3:
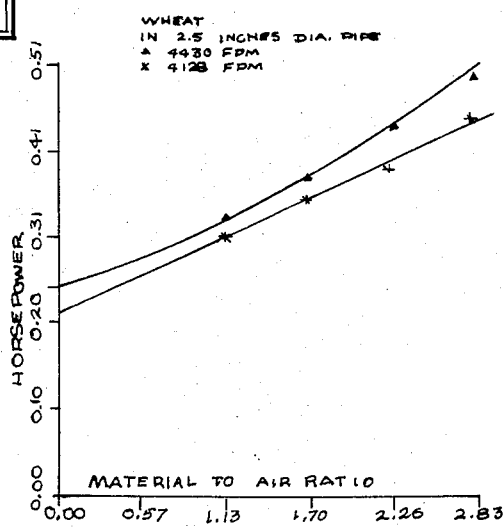
FIG. 3 is a graph of horsepower versus material to air ratio for wheat in a pneumatic conduit.

With continuing reference to the drawings for operation of the invention, the set point 36 on the controller 32 is set for the desired pneumatic flow velocity for each of the pneumatic conduits 18. The cam segment 56 activates or engages one set of the first 40, the second 42, and the third 44 2-way valve means 38 while simultaneously releasing another set of same. When this is done the controller 32, through the engaged second 42 and the engaged third 44 2-way valve means, can detect and read the pressure signal in the pneumatic conduit 18 emanating from the pneumatic conduit's 18 respective venturi inlet 22 and venturi throat 24 which are respectively pneumatically connected to the engaged second 42 and the engaged third 44 2-way valve means. Any previous differential pressure signal from a prior engaged set of 2-way valve means 38 is released by the controller 32. When the actual pneumatic flow velocity is different than the set desired pneumatic flow velocity from the set point 36, the controller 32 sends an output signal to the pneumatic actuator 30 through the engaged or activated first 40 2-way valve means (which is pneumatically connected to the pneumatic actuator 30) in order to readjust the output pressure of the pneumatic actuator 30 which in turn resets its respective damper 28 in the pneumatic conduit 18. The output signal to the pneumatic actuator 30 from the controller 32 is stopped, and set point 36 is reset, and the entire process is repeated in order to sense the next pressure differential signal, while retaining the immediate prior pressure differential signal. The sequencer 46 will allow the controller 32 to see the pressure signals from each flow meter (of the venturi 20) for 10 to 15 seconds before going on to the next line. This gives the controller 32 enough time to readjust the output pressure to the activator 30 and reset the damper 28 when the conveying velocity is different than the set point 36 velocity. The sequencer 46 will continue to advance so that velocity in each lift 12 is checked and adjusted every five to ten minutes. The system is completely automatic so when the conveying load increases the damper 28 will open to maintain conveying velocity and prevent a choke. When the conveying load is reduced, the damper 28 will close down so that air velocity will remain constant and not tend to increase. As requirements change, mill flows revised and conveying loads increase or decrease for any reason, the conveying velocity will remain at a constant minimum velocity in order to maintain a pneumatic conveying system in balance, at the energy efficient minimum conveying velocity (see FIG. 3 for wheat in a pneumatic conduit 18).

While the present invention has been described herein with reference to particular embodiments thereof, a latitude of modification, various changes and substitutions are intended in the foregoing disclosure and it will be appreciated that in some instances some features of the invention will be employed without a corresponding use of other features without departing from the scope of the invention as set forth.

I claim:

1. A pneumatic conveying air velocity control apparatus comprising at least one pneumatic lift including at least one cyclone means, at least one manifold means, at least one pneumatic conduit intercommunicating the cyclone means with the manifold means and having a structure defining a venturi with a venturi inlet side and a venturi throat;
    at least one damper means pivotally connected within said at least one pneumatic conduit on said venturi inlet side;
    at least one pneumatic actuator means engaged to said damper means for opening and closing same;
    a controller means;
    at least one set of a first, a second and a third 2-way valve means for each of said at least one pneumatic lift;
    said first 2-way valve pneumatically communicating with said pneumatic actuator, and with said controller means;
    said second 2-way valve pneumatically communicating with said venturi inlet side and said controller means and said third 2-way valve pneumatically communicating with said venturi throat and said controller means, for detecting the pneumatic flow rate through said pneumatic conduit;
    a sequencer means for mechanically engaging only one set of 2-way valve means at any given time; said sequencer means comprises a valve plate means having a structure defining an aperture;
    a shaft means rotatably positioned through said aperture;
    a cam means bound to the end of said shaft means in order to rotate therewith;
    multiple sets of said first, said second, and said third 2-way valve means radially disposed on said valve plate means from the aperture thereof;
    a gear motor means for imparting rotational power to said shaft means;
    and an endless belt means rotationally bound to said shaft means and to said motor means for delivering rotational power from the motor means to the shaft means.

2. The apparatus of claim 1 wherein said cam means comprises a cam plate means bound to said shaft means to unisonly rotate therewith;
    a cam segment means bound superimposedly to said cam plate means and having a structure defining an arc.

3. A pneumatic conveying air velocity control apparatus comprising at least one pneumatic lift including at least one cyclone means, at least one manifold means, at least one pneumatic conduit intercommunicating the cyclone means with the manifold means and having a structure defining a venturi with a venturi inlet side and a venturi throat;
    at least one damper means pivotally connected within said at least one pneumatic conduit on said venturi inlet side:
    at least one pneumatic actuator means engaged to said damper means for opening and closing same:
    a controller means:
    at least one set of a first, a second and a third 2-way valve means for each of said at least one pneumatic lift;
    said first 2-way valve pneumatically communicating with said pneumatic actuator, and with said controller means;
    said second 2-way valve pneumatically communicating with said venturi inlet side and said controller means and said third 2-way valve pneumatically communicating with said venturi throat and said controller means, for detecting the pneumatic flow rate through said pneumatic conduit;
    a sequencer means for mechanically engaging only one set of 2-way valve means at any given time and having a valve plate means with a structure defining an aperture, a shaft means rotatably positioned through said aperture, and a cam means bound to the end of said shaft means in order to rotate therewith.

4. The apparatus of claim 3 wherein said sequencer means additionally comprises multiple sets of said first, said second, and said third 2-way valve means radially disposed on said valve plate means from the aperture thereof.

5. The apparatus of claim 4 wherein said sequencer means additionally comprises a gear motor means for imparting rotational power to said shaft means.

6. The apparatus of claim 5 wherein said sequencer means additionally comprises an endless belt means bound rotationally to said shaft means and to said motor means for delivering rotational power from the motor means to the shaft means.

7. The apparatus of claim 6 wherein said cam means comprises a cam plate means bound to said shaft means to unisonly rotate therewith;
   a cam segment means bound superimposedly to said cam plate means and having a structure defining an arc.

8. A method for controlling with a controller means the pneumatic velocity in a pneumatic conveying air velocity control apparatus having multiple pneumatic lifts including multiple cyclone means, at least one manifold means, multiple pneumatic conduits intercommunicating each of the cyclone means with the manifold means and having a structure defining a venturi with a venturi inlet side and a venturi throat, and at least one damper means pivotally connected within each of the pneumatic conduits, and at least one pneumatic actuator means engaged to each damper means for opening and closing same, said method comprising the steps of:
   (a) mounting at least one set of a first, a second, and a third 2-way valve means to a valve plate means of a sequencer means such that only one set of 2-way valve means is engaged at any given time, and wherein said sequencer means comprises a valve plate means having a structure defining a aperture, a shaft means rotatably positioned through said aperture, and a cam means bound to the end of said shaft means in order to rotate therewith;
   (b) engaging mechanically said one set of 2-way valve means to each of said pneumatic lift by rotating said shaft means and the cam means bound thereto such that each of said first 2-way valve means is respectively pneumatically engaged to said controller means and to each of said pneumatic actuator means, and each of said second 2-way valve means is respectively pneumatically engaged to said controller means and to each of said venturi inlet sides and each of said 2-way valve means is respectively pneumatically engaged to said controller means and to each of said venturi throat;
   (c) setting in said controller means the desired pneumatic flow velocity for each of said pneumatic conduits;
   (d) engaging at any given time only one set of said first, said second and said third 2-way valve means by rotating said shaft means and the cam means bound thereto such that the controller means through the engaged said second and engaged said third 2-way valve means can detect and read the pressure signals in the pneumatic conduit and emanating from said venturi inlet side and said venturi throat pneumatically connected to said engaged said second and engaged said third 2-way valve means such that when the acutal pneumatic flow velocity is different than the set desired pneumatic flow velocity of step (c) the controller means sends an output signal to said pneumatic actuator means through the engaged said first 2-way valve means which is pneumatically connected to said pneumatic actuator means in order to readjust the output pressure of said pneumatic actuator means which in turn resets said damper means in said pneumatic conduit.

9. The method of claim 8 additionally comprising disengaging said only one set of said first, said second and said third 2-way valve means of step (d) while simultaneously engaging another set of said first, said second and said third 2-way valve means, and repeating step (c) for the second engaged set.

10. The method of claim 8 wherein said engaging step (d) is with a cam segment means bound superimposedly to a cam plate means and having a structure defining an arc.

* * * * *